(12) United States Patent
Nasr et al.

(10) Patent No.: US 6,726,864 B2
(45) Date of Patent: Apr. 27, 2004

(54) SIMULATED STONE TEXTURE PROCESS

(76) Inventors: Moe Nasr, 4614 Bryn Mawr, Houston, TX (US) 77057; Kurt Kuriger, 13606 Shoreline Dr., Willis, TX (US) 77318

( * ) Notice: Subject to any disclaimer, the term of this patent is extended or adjusted under 35 U.S.C. 154(b) by 279 days.

(21) Appl. No.: 10/037,189

(22) Filed: Nov. 9, 2001

(65) Prior Publication Data
US 2002/0145229 A1 Oct. 10, 2002

Related U.S. Application Data

(60) Provisional application No. 60/247,652, filed on Nov. 9, 2000.

(51) Int. Cl.[7] ................ B29C 44/06; B29C 41/06
(52) U.S. Cl. ............. 264/46.4; 264/46.6; 264/245; 264/255; 264/310
(58) Field of Search ............... 264/245, 255, 264/46.4, 46.6, 310

(56) References Cited

U.S. PATENT DOCUMENTS

| | | | | |
|---|---|---|---|---|
| 3,940,528 A | * | 2/1976 | Roberts | 428/161 |
| 3,950,477 A | * | 4/1976 | Di Giacomo | 264/226 |
| 4,043,826 A | * | 8/1977 | Hum | 523/218 |
| 4,668,451 A | * | 5/1987 | Langson | 264/39 |
| 4,847,026 A | * | 7/1989 | Jarboe et al. | 264/46.7 |
| 5,395,577 A | * | 3/1995 | Gorski | 264/227 |
| 5,911,927 A | * | 6/1999 | Roberts | 264/46.4 |
| 6,042,766 A | * | 3/2000 | Bahr | 264/46.6 |
| 6,248,411 B1 | * | 6/2001 | Warfel | 428/15 |
| 6,362,302 B1 | * | 3/2002 | Boddie | 528/73 |

* cited by examiner

Primary Examiner—Allan R. Kuhns
(74) Attorney, Agent, or Firm—Harrison Law Office, PC

(57) ABSTRACT

Simulated stone texture products are obtained when specially selected materials are properly admixed and formed via rotational molding. These products are manufactured from suitable molds according to a prescribed process methodology using synthetic polymeric materials instead of stone materials. Prerequisite surface textures are produced that effectively simulate the corresponding actual stone products.

38 Claims, 3 Drawing Sheets

SIMULATED STONE TEXTURE PROCESS

RELATED APPLICATIONS

This application claims priority based upon Provisional U.S. Application Ser. No. 60/247,652 filed Nov. 9, 2000.

BACKGROUND OF THE INVENTION

The present invention relates to stone structures and products, and, more particularly, relates to a process for manufacturing simulated stone products from polymer-based composite materials.

It is well known that conventional stone products such as wall panels, columns, light standards, mailbox enclosures, planters, and the like are inherently heavy and cumbersome because of the nature of the underlying stone materials. In addition, manufacturing of stone products is likewise difficult and cumbersome because of the well known limitations of working with stone materials and related binders, glues, etc., especially in a mass-production environment.

Of course, once stone products are manufactured, there is still the problem of distributing and shipping the heavy structures. Breakage and accidents are, unfortunately, not infrequent. There is presently no reproducible methodology known in the art that enables "stone" products to be manufactured from a combination of materials excluding stone. What is needed is a formulation of materials and a methodology for manufacturing simulated stone products from these materials that afford the textural and functionality associated with stone structures and products, but none of the infirmities associated with manufacturing, distributing, and installing stone structures and products.

SUMMARY OF THE INVENTION

The present invention teaches simulated stone texture products that are manufactured from a specially formulated combination of non-stone materials that, when properly admixed and formed via molding techniques. Since these products are manufactured from formulations of materials based upon synthetic polymeric materials instead of stone materials, the simulated stone products are lightweight, safer to assemble into structures and products than conventional stone structures and products, and are easier to distribute and transport.

In another aspect of the present invention, special molding techniques have been discovered that engender the prerequisite textural surface attributes contemplated by the present invention—that effectively simulate actual stone products and structures.

These and other objects and features of the present invention will become apparent from the following detailed description, wherein reference is made to the figures in the accompanying drawings.

DETAILED DESCRIPTION

Figure 1:
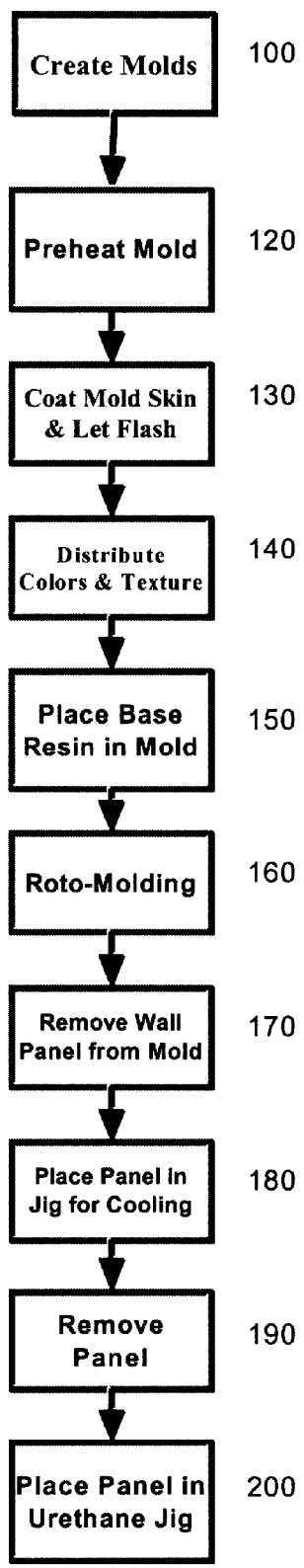
FIG. 1 is a block diagram of the step-wise rotational molding process used for manufacturing the preferred embodiment of the present invention

The present invention teaches a combination of materials and molding manufacturing method for producing simulated stone texture structures and products hereinbefore unknown in the art. The preferred embodiment of the present invention constitutes a "Tuftek" wall panel that resembles a conventional dry-stacked stone wall. As will be readily understood by those skilled in the art, such conventional dry-stacked stone walls may be constructed from a diversity of component stones. It has been discovered that the simulated stone texture structures of the present invention may be manufactured with suitable colors that emulate the corresponding colors of the natural stones that are being simulated in the underlying formulation.

The combinations of the present invention comprise an admixture of component materials that, when processed using molding techniques, and preferably using rotational molding techniques—in a mold suitably configured to engender the intended form—produce simulated stone structures and products that afford a panoply of textural and structural properties that have heretofore been unknown in the art. It is, of course, well known in the art that commonly used molding techniques include blow molding, vacuum molding, rotational molding, etc. As will be hereinafter described, formulations of the present invention include polymeric materials, colorants or coloring materials applicable to concrete and stone, sand, tires to impart bulk and the like, and binder or glue compounds.

As is well known in the art, rotational molding procedures have afforded means for exploiting an unique ensemble of capabilities and properties of polymeric materials. Of particular applicability to the present invention is the combination of colors, surface textures and finishes that materials acquire when manufactured by rotational molding ("rotomolding" or "rotomolding") or other molding techniques. As will be readily understood by those conversant in the art, rotomolded products taught by the present invention may be more economically manufactured than similar products manufactured via conventional injection or blow molding, or via carving stone and masonry materials. Nevertheless, while preferred embodiments of the present invention are produced by application of the rotational molding process, other embodiments of the present invention may be produced by adapting other molding techniques but at a higher cost.

Composite mixtures suitable for manufacturing simulated stone texture products preferably via rotational molding preferably comprise the following components:

| No. | Component | % by Volume |
|---|---|---|
| 1 | Tires | 5–6.5 |
| 2 | Dried Solids | 3–3.5 |
| 3 | Polymer | 50–68 |
| 4 | Glue | 3–10 |
| 5 | Sand | 10–22 |
| 6 | Cement | 5–11 |
| 7 | Coloring | 5–12 |
| 8 | Color Hardener | 4–14 |

As will be appreciated by those skilled in the art, selection of a suitable molding powder or resin is crucial to a successful molding operation. It has been found that suitable UV-stabilized linear low density polyethylene ("LLDPE") raw material resins, commercially available from several manufacturers, with a melt index in the range 2.0–6.5. LLDPE resins having acceptable combination of density per ASTM D-1505 and melt index per ASTM D-1238 (condition 2.16, 190) are illustrated in Table 1. LLDPE provides superior mechanical properties, e.g., higher stiffness, excellent low temperature impact strength and environmental stress crack resistance, than low density polyethylene ("LDPE") or high density polyethylene ("HDPE"), in rotational molding fabrication of products and structures contemplated herein.

TABLE 1

LLDPE By Ascending Melt Index

|  | 1 | 2 | 3 | 4 | 5 | 6 |
|---|---|---|---|---|---|---|
| Density | .941 | .938 | .938 | .941 | .935 | .936 |
| Melt Index | 2.0 | 2.6 | 3.5 | 4.0 | 5.9 | 6.5 |
| Flexural Modulus | 130,000 | 95,000 | 102,000 | 120,000 | 87,000 | 80,700 |

LLDPE raw materials contemplated by the present invention may be readily obtained from suppliers worldwide. Suppliers in the United States include Southern Polymer, Inc. of Atlanta, Ga.; Mobil Chemical of Edison, N.J.; Millennium Petrochemicals Inc. of Cincinnati, Ohio; H. Muehlstein & Company, Inc. of Houston, Tex.; Chroma Corporation of McHenry, Ill.; A.Schulman, Inc. of Akron, Ohio; and Formosa Plastics. For instance, a Southern Polymer LLDPE resin corresponding to properties shown in column 4 of Table 1, includes a tensile strength of 2,700 psi per ASTM D-638 (2" per minute, Type IV specimen, @ 0.125" thickness), heat distortion temperature of 53° C. @ 66 psi and 40° C. @ 264 psi per ASTM D-648, low temperature impact of 50 ft. lbs. for a ⅛" specimen and 190 ft. lbs. for a ¼" specimen per ARM Low Impact Resistance. As another example, Millennium Petrochemicals sells LLDPE resin GA-635-661 corresponding to properties shown in column 6 of Table 1, which includes a tensile strength of 2,500 psi per ASTM D-638, heat distortion temperature of 50° C. @ 66 psi and 35° C. @ 264 psi per ASTM D-648, low temperature impact of 45 ft. lbs. for a ⅛" specimen and 200 ft. lbs. for a ¼" specimen per ARM Low Impact Resistance, and ESCR Condition A, F50 of greater than 1,000 hrs. per ASTM D-1693 @ 100% lgepal and 92 hrs. @ 10% lgepal. Similarly, Mobil Chemical sells MRA-015 corresponding to properties shown in column 5 of Table 1, which includes a tensile strength of 2,650 psi, heat distortion temperature of 56° C. @ 66 psi and 39° C. @ 264 psi, low temperature impact of 58 ft. lbs. for a ⅛ specimen and 180 ft. lbs. for a ¼" specimen, and ESCR Condition A, F50 of more than 1,000 hrs. @ 100% lgepal. Similarly, Nova Chemicals sells TR-0338-U/UG corresponding to properties shown in column 3 of Table 1, which includes a tensile strength of 3,000 psi, heat distortion temperature of 50° C. @ 66 psi, low temperature impact of 60 ft. lbs. for a ⅛" specimen, and ESCR Condition A, F50 of more than 1,000 hrs. @ 100% lgepal. As yet another example is Formosa Plastics' Formolene L63935U having Melt Index of 3.5 and density of 0.939, along with flexural modulus of 110,000 psi, a tensile strength of 3,300 psi at yield, heat defection temperature of 54° C. @ 66 psi, low temperature impact of 60 ft. lbs. for a ⅛" specimen, and ESCR Condition A, F50 of greater than 1,000 hrs. @ 100% lgepal and 60 hrs. @ 10% lgepal.

Another component of the combinations of materials taught by the present invention is a latex adhesive adapted to accomplish the purposes herein described in detail. For instance, XP-10-79 C pressure sensitive adhesive of Chemical Technology Inc. (Detroit, Mich.) is a water base adhesive with a styrene butadiene adhesive base designed to bond various foam substrates, polyethylene and polystyrene. Representative properties include a viscosity of 5000–7000 cps Brookfield RVT Spindle #3 @ 77° F.; pH 7.5–9.5; weight per gallon of 8.3 lb; no flash point; color blue; 50–54% solids; 20 minutes dry time; no freeze/thaw cycle (should get or be frozen). Another suitable adhesive is Henkel Adhesives (Lewisville, Tex.) polyvinyl resin emulsion 52-3069 having a viscosity of 3750 cps Brookfield RVT @ 76° F.; pH 4.5; weight per gallon of 9.0 lb; 55% solids; 212 boiling point °F.; specific gravity of 1.1; vapor pressure the same as water @ 20° C.; solubility in water is dispersible when wet; white fluid appearance; polyvinyl odor; no flash point.

It will be appreciated that another component material of the present invention is pigments colors selected from a broad group of organic, inorganic, mineral oxide, cement, graded silica aggregates, special conditioning admixtures. For example, a suitable pigment color component is Bomanite Color Hardener which is a dry shake material designed for coloring and hardening concrete flatwork. It is comprised of a blend of mineral oxide pigments, cement, and graded silica aggregates. Special conditioning admixtures may also be included to improve workability. Bomanite Color Hardener has been found to be useful either in its regular grade or its heavy duty grade. As will be appreciated by those skilled in the art, the regular grade is intended for applications such as residential driveways, patios, pool decks, entryways, walkways, showroom floors, lobbies, and medians. On the other hand, the heavy duty grade—formulated with specially graded Emery, i.e., aluminum oxide to increase wear resistance—is intended for heavy-traffic applications such as vehicular entrances, theme parks, plazas, crosswalks, street sections, and highly-trafficked sidewalks. As will be understood by those conversant in the art, a color hardeners such as Bomanite Color Hardener affords a variety and intensity of colors such that many hues ranging from soft pastels to vivid blues and purples may be obtained, having improved imprinting, increased durability, and wear and fade resistance qualities.

As will be readily appreciated by those skilled in the art, another component material taught by the present invention is foam, preferably conventional ½ pound density packing urethane foam. For such structures and products as simulated stone wall panels, separate from the stone texture obtained as contemplated herein, such urethane foam has been found to impart excellent sound absorption qualities and structural stability. It should be evident to those skilled in the art that simulate stone texture wall panels of the present invention not only accurately replicate the look and feel of stone, but also replicate some of its physical properties.

Rotational molding has been found to be an advantageous process for manufacturing the simulated stone structures and products taught by the present invention. Conventional roto-molding is a 3-stage, pressure-free plastic molding process. During the first stage, the mold is heated while rotating in two perpendicular planes. Heat transfer causes the plastic charge of material contained within the mold to melt and uniformly coat the mold's interior surfaces. During the second stage, the mold is cooled by air and/or water spray. During the third stage, the molded product is unloaded from the mold and a new charge of material is loaded thereinto.

It will be understood that the resin or other materials being molded is subjected to slow-speed rotation on two perpendicular axes: a major axis (vertical) and a minor axis (horizontal). As heat penetrates the mold, the resin tends to adhere to the inner surfaces of the mold until complete fusion occurs. Then, the mold is cooled while still being rotated, so that a gradual temperature-reduction is effectuated. It is common knowledge that cycle times for such roto-molding processes may be from as few as about 10 minutes to as many as 60 minutes, depending upon the nature of the resin and other components, mold size and configuration, and wall thickness.

The simulated stone products contemplated by the present invention are formed preferably via rotational molding at temperatures between 400–695° F. In particular, to achieve the stone products and structures contemplated by the present invention, it has been found to be preferable to effectuate the multi-step manufacture procedure depicted in the block diagram in FIG. 1. First, in step 120, a specially-designed preferably cast aluminum mold (manufactured in step 100) should be preheated in a roto-molding oven to an outside mold temperature in the range 350–750° F., and preferably to an outside mold temperature in the range 500–650° F., and more preferably to an outside mold temperature in the range 550–625° F. It has been found that, generally, the best results contemplated under the present invention are obtained when the outside mold temperature is 575° F. As will be understood by those skilled in the art, it is essential that the temperature of the outside mold be sufficiently elevated in the range 250–400° F. to enable flashing of the modified latex adhesive. It should be understood that the term "flashing" is meant to correspond to substantially remove the water from water-based adhesive so that only solids remain; this, of course, avoids the adverse formation of steam in the mold as heat is applied.

After the mold is preheated as hereinbefore described, in step 130, the mold is opened to provide access to its face, for placement of adhesives, pigments, color, and texture components. More particularly, with the mold now opened, the face of the mold is lightly coated with latex glue and allowed to set until the glue flashes or becomes tacky to touch. A typical glue found to be effective for the purposes of the present invention is Henkel MM 8-15-1. It has been found to be particularly effective to spray latex adhesive using an airless spray means in such quantity to assure the in situ retention of coloring pigments and textures. Ergo, it should be clear that the preheating step is to enable the modified latex adhesive to be flashed-off the mold surface. Stated differently, the preheating step causes the water portion of the adhesive to evaporate, thereby leaving a solid residue for retaining coloring pigments and textures in place while the roto-molding powder or resin is melting and being formed into the wall panel contemplated by the present invention.

In the next step, depicted in FIG. 1 as numeral 140, the panoply of colors corresponding to the stones being simulated are selected. Color pigments and texturing components are applied to the face of the mold wherein these components preferably become imbedded with or integrated into the adhesive. It will be understood that the well-known Dry Shake method should preferably be used because the color pigments and texturing components are preferably in powder form preferably with mesh sizes of no more than the range 20–40.

Referring to a simulated stone texture wall panel as an illustrative product manufactured by the techniques taught by the present invention, it has been found that 2–4 pounds of color components provides the prerequisite color in the wall panel. It has further been found that it is critical, for achieving the high quality simulated stone structures and products of the present invention, for neither too much nor too little color pigment and texturing components to be applied in this step. In particular, a range of 5–20% of the total weight of the LLDPE base resin, corresponding to 30–40 pounds, has been found to provide suitable simulated stone embodiments. Again using a simulated stone wall panel for illustrative purposes, it will become evident that, in proportion to these 30–40 pound color pigments and texturing components, there is 40–50 pounds of a completely formulated and manufactured wall panel—comprising base resin, color pigments and texturing components, unflashed adhesives, and urethane foam. Thus, to produce such a wall panel, a mold contemplated by the present invention is loaded with about 35 pounds of linear low-density polyethylene in conjunction with other polymer and oxide pigments. Color hardener, such as a Coloration Systems hardener, consisting of graded silica aggregates, cement, and mineral oxide pigments, is applied to the face of the mold using a dry-shake method.

Next, in step 150, the mold is closed and prepared for a roto-molding cycle. While, of course, any rotational molding apparatus would suffice, it has been found to be preferable to effectuate the roto-molding process (step 160) using a R.E.I. 120 3-arm carousel unit or similar apparatus. As will become evident to those skilled in the art, the oven temperature should preferably be about 500° F.–650° F. preferably for about 18–22 minutes. It has been found to be advantageous to simultaneously perform the rotational molding procedure with the arm rotations set to 10–12 RPM major axis and 6–8 RPM minor axis. In the following step, depicted as numeral 170, the formed or molded product is unloaded and a new charge of material is reloaded.

In step 180, as should be clear to those skilled in the art, the formed material that has been removed from the mold is then subjected to a cooling cycle in a conventional cooling jig or other suitable cooling receptacle wherein the uniform shape thereof may be sustained. Once inserted into the jig, the jig is closed, wherein an air hose is inserted into the vent aperture so that air may be blown therethrough until the composite composition panel is substantially cool to the touch. More particularly, cool air is injected onto this material through a vent hole located at one end thereof and allowed to escape through the vent hole at the other, opposite end thereof. It has been found that this cooling step should preferably be comprised of 15–20 minutes of air, preferably 1–2 minutes of water, and then preferably 1–2 minutes of air.

Next, in step 190, the mold is removed from the cooling jig and placed into a reinforced form, for manufacturing the wall panel embodiment, to inject ½ pound density urethane form. As will be appreciated by those skilled in the art, this foam component promotes sound deadening and shape retention. Manufacturing of the preferred embodiment of the simulated stone panel taught by the present invention is then substantially complete. It should be clear to those skilled in the art that such a bulking-up and sound-proofing material would not be applicable to most other simulated stone texture products such as planters and mailbox enclosures.

According to the preferred embodiment, the mold that is used to manufacture products that simulate stone has been developed by adapting technology used for manufacturing plastics materials. As will be readily appreciated by those skilled in the plastics molding art, in order to properly and effectively simulate the characteristics of stone panels—particularly the surface appearance and texture thereof—certain detail was required to be present in the corresponding interior surfaces of the mold. Unfortunately, such skilled practitioners were unable to produce models which provided the prerequisite surface detail and the like.

Figure 2:
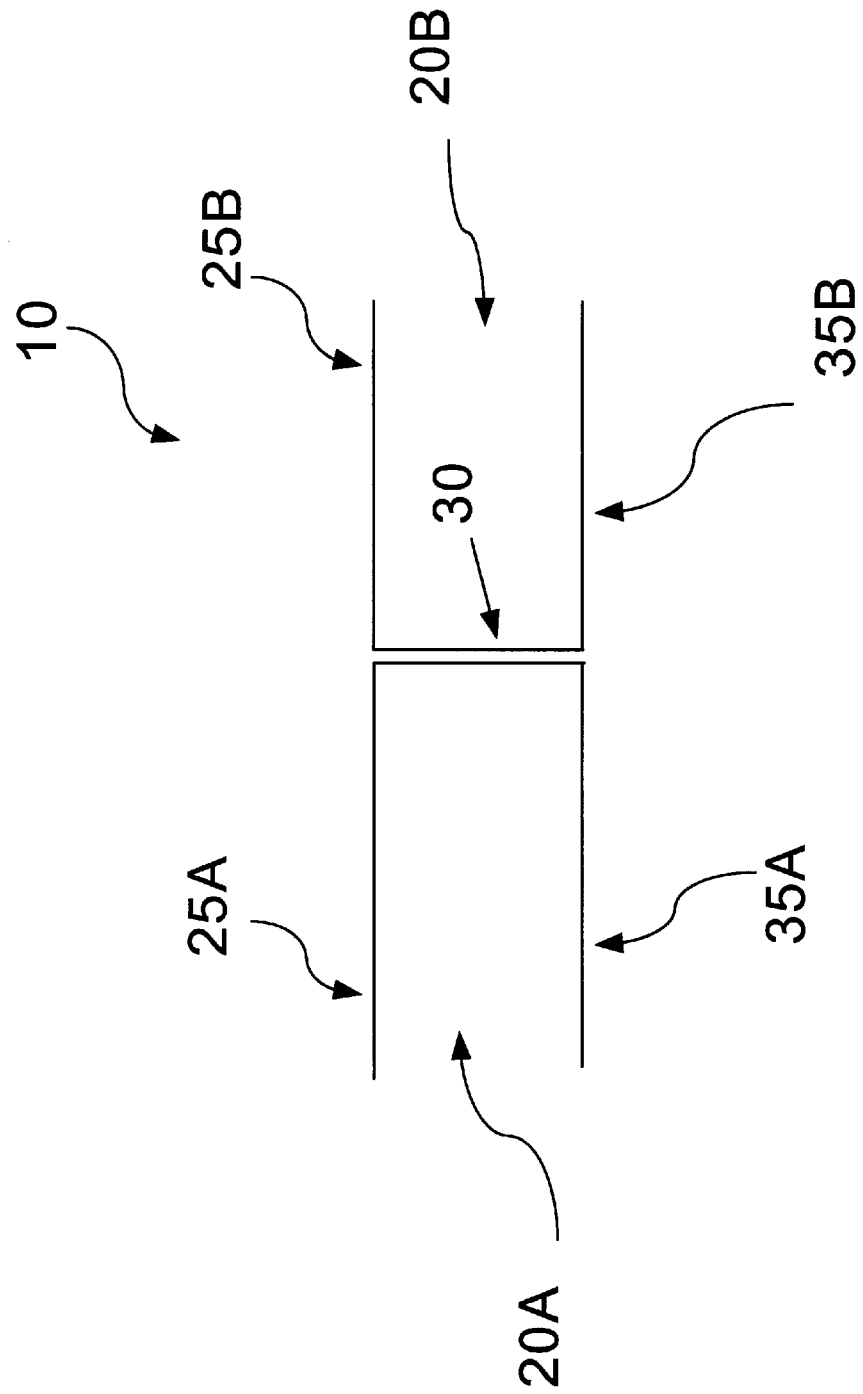
FIG. 2 is simplified frontal view of a prior art simulated stone panel.

Referring now to FIG. 2, there is shown a simplified frontal view of a typical plastic wall structure 10 intended to simulate stone. This structure is comprised of panels 20A and 20B. The obvious artificial character of this plastic wall is clear from the substantially smooth plurality of edges 25A and 35A of panel 20A, and similar top edge 25B and bottom edge 35B of panel 20B. Furthermore, the interface 30 between panels 20A and 20B is also substantially smooth in appearance—clearly not an accurate simulation of stone texture.

Now referring to FIG. 2, there is shown a simplified frontal view of a plastic wall structure 50 intended to simulate stone texture according to the teachings of the present invention. This structure is comprised of panels 60A and 60B. The stone-like character of this plastic wall is clear from the substantially jagged plurality of edges 65A and 75A of panel 60A, and similar top edge 65B and bottom edge 65B of panel 60B. It is seen that the interface 80 between panels 60A and 60B is specially designed to form step-like structure 85 to properly simulated the uneven joinder between two actual stone panels.

Figure 3:
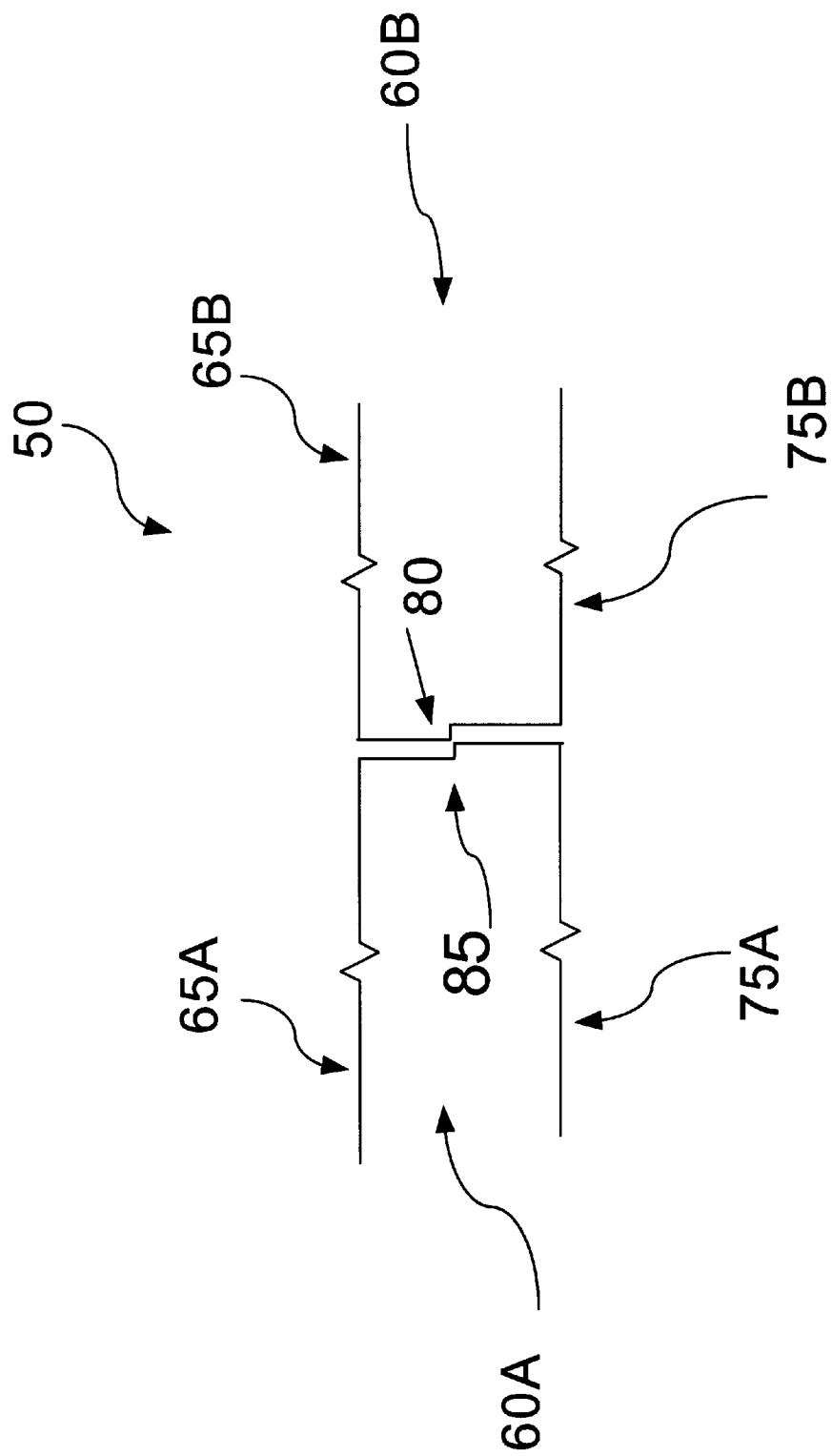
FIG. 3 is simplified frontal perspective view of the preferred embodiment of the present invention, corresponding to a simulated stone texture panel.

It will be appreciated by those skilled in the art that the mold corresponding to the simulated stone textured wall panel 50 depicted in FIG. 3 is constructed with deep joints and reveals. The edges of the mold are specially configured to produce the irregular surfaces and edges that are inherent in stone panels and other stone products and structures.

It is an advantage and feature of the present invention that wall panels produced with the materials and according to the molding techniques of the present invention are not only surprisingly lightweight, but also are readily stacked and layered to enable walls or fences or the like to be used as simulated barriers or decorative partitions for homes, building, or the like. It is also an advantage and feature of the present invention that structures and products produced with the materials and according to the molding techniques of the present invention are surprisingly lightweight and may be manufactured in a wide range of colors, Other variations and modifications will, of course, become apparent from a consideration of the structures and techniques hereinbefore described and depicted. Accordingly, it should be clearly understood that the present invention is not intended to be limited by the particular features and structures hereinbefore described and depicted in the accompanying drawings, but that the present invention is to be measured by the scope of the appended claims herein.

What is claimed is:

1. A method for manufacturing a simulated stone texture product from a plastic resin, said method comprising the steps of:

preheating in an oven a mold configured to form a suitable shape corresponding to said simulated stone product;

opening said preheated mold to provide access to its face;

coating said face of said mold with a latex glue material;

allowing said latex glue coating to set until said latex glue flashes off substantially all water contained therein, to yield a solid adhesive residue for retaining coloring pigments and texturing materials;

selecting materials to impart stone colors and textures being simulated;

applying said coloring and texturing materials to said mold face to become embedded with or integrated into said solid adhesive residue;

loading a base resin charge into said mold;

closing said charged mold;

molding said base resin charge in a temperature range of 500° F.–650° F.;

unloading said molded base resin charge from the mold;

cooling said molded base resin charge to sustain said shape of said molded product; and removing said cooled base resin charge from a cooling jig.

2. The method recited in claim 1, wherein said preheating step preheats said mold to an outside mold temperature in the range 500° F.–650° F.

3. The method recited in claim 1, wherein said preheating step preheats said mold to an outside mold temperature in the range 550° F.–625° F.

4. The method recited in claim 1, wherein said preheating step preheats said mold to an outside mold temperature of 575° F.

5. The method recited in claim 1, wherein said mold is coated with said latex glue using an airless spray means to assure in situ retention of coloring pigments and texturing materials.

6. The method recited in claim 1, wherein said step of applying said coloring and texturing materials to said mold face is performed using a dry shake method.

7. The method recited in claim 1, wherein said coloring and texturing materials are in the range of 5–20% of the total weight of said base resin charge.

8. The method recited in claim 1, wherein said base resin charge comprises linear low density polyethylene.

9. The method recited in claim 1, wherein said molding of said base resin charge proceeds via rotational molding.

10. The method recited in claim 9, wherein said rotational molding of said base resin charge proceeds for 18–22 minutes.

11. The method recited in claim 9, wherein said rotational molding of said base resin charge proceeds with arm rotations set to 10–12 RPM major axis and 6–8 RPM minor axis.

12. The method recited in claim 1, wherein said cooling of said molded base resin charge step comprises injecting cool air into said molded base resin charge.

13. The method recited in claim 12, wherein said air cooling of said molded base resin charge step proceeds for 15–20 minutes.

14. The method recited in claim 13, wherein said cooling of said molded base resin charge step is further comprises injecting cool water into said molded base resin charge after said injection of cool air.

15. The method recited in claim 14, wherein said water cooling of said molded base resin charge step proceeds for 1–2 minutes.

16. The method recited in claim 15, wherein said cooling of said molded base resin charge step further comprises injecting subsequent cool air into said molded base resin charge after said injection of cool water.

17. The method recited in claim 16, wherein said subsequent air cooling of said molded base resin charge step proceeds for 1–2 minutes.

18. The method recited in claim 1, wherein said step of cooling said molded base resin charge includes a foam injection step for a said simulated stone product that requires shape retention and sound deadening properties.

19. The method recited in claim 1, wherein said preheating step comprises heating said mold to an outside mold temperature in the range 350° F.–750° F.

20. A method for manufacturing a simulated stone texture product from a plastic resin, said method comprising the steps of:

preheating in an oven a mold configured to form a suitable shape corresponding to said simulated stone product;

opening said preheated mold to provide access to its face;

coating said face of said mold with a latex glue material;

allowing said latex glue coating to set until said latex glue flashes off substantially all water contained therein, to yield a solid adhesive residue for retaining coloring pigments and texturing materials;

selecting materials to impart stone colors and textures being simulated;

applying said coloring and texturing materials to said mold face to become embedded with or integrated into said solid adhesive residue;

closing said mold;

loading a base resin charge into said mold;

molding said base resin charge in a temperature range of 500° F.–650° F.;

unloading said molded base resin charge from the mold;

cooling said molded base resin charge to sustain said shape of said molded product; and removing said cooled base resin charge from a cooling jig.

21. The method recited in claim 20, wherein said preheating step preheats said mold to an outside mold temperature in the range 500° F.–650° F.

22. The method recited in claim 20, wherein said preheating step preheats said mold to an outside mold temperature in the range 550° F.–625° F.

23. The method recited in claim 20, wherein said preheating step preheats said mold to an outside mold temperature of 575° F.

24. The method recited in claim 20, wherein said mold is coated with said latex glue using an airless spray means to assure in situ retention of coloring pigments and texturing materials.

25. The method recited in claim 20, wherein said step of applying said coloring and texturing materials to said mold face is performed using a fry shake method.

26. The method recited in claim 20, wherein said coloring and texturing materials are in the range of 5–20% of the total weight of said base resin charge.

27. The method recited in claim 20, wherein said base resin charge comprises linear low density polyethylene.

28. The method recited in claim 20, wherein said molding of said base resin charge proceeds via rotational molding.

29. The method recited in claim 28, wherein said rotational molding of said base resin charge proceeds for 18–22 minutes.

30. The method recited in claim 28, wherein said rotational molding of said base resin charge proceeds with arm rotations set to 10–12 RPM major axis and 6–8 RPM minor axis.

31. The method recited in claim 20, wherein said cooling of said molded base resin charge step comprises injecting cool air into said molded base resin charge.

32. The method recited in claim 22, wherein said air cooling of said molded base resin charge step proceeds for 15–20 minutes.

33. The method recited in claim 32, wherein said cooling of said molded base resin charge step is further comprises injecting cool water into said molded base resin charge after said injection of cool air.

34. The method recited in claim 33, wherein said water cooling of said molded base resin charge step proceeds for 1–2 minutes.

35. The method recited in claim 34, wherein said cooling of said molded base resin charge step further comprises injecting subsequent cool air into said molded base resin charge after said injection of cool water.

36. The method recited in claim 35, wherein said subsequent air cooling of said molded base resin charge step proceeds for 1–2 minutes.

37. The method recited in claim 20, wherein said step of cooling said molded base resin charge includes a foam injection step for a said simulated stone product that requires shape retention and sound deadening properties.

38. The method recited in claim 20, wherein said preheating step comprises heating said mold to an outside mold temperature in the range 350° F.–750° F.

* * * * *